US012689990B2

(12) United States Patent
Nakahira et al.

(10) Patent No.: US 12,689,990 B2
(45) Date of Patent: *Jul. 21, 2026

(54) BASE STATION CONTROL SYSTEM, BASE STATION CONTROL METHOD, BASE STATION CONTROL APPARATUS AND PROGRAM

(71) Applicant: NTT, Inc., Tokyo (JP)

(72) Inventors: Toshiro Nakahira, Tokyo (JP); Motoharu Sasaki, Tokyo (JP); Daisuke Murayama, Tokyo (JP); Shota Nakayama, Tokyo (JP); Takatsune Moriyama, Tokyo (JP); Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 18/578,994

(22) PCT Filed: Aug. 26, 2021

(86) PCT No.: PCT/JP2021/031421
§ 371 (c)(1),
(2) Date: Jan. 12, 2024

(87) PCT Pub. No.: WO2023/026445
PCT Pub. Date: Mar. 2, 2023

(65) Prior Publication Data
US 2024/0323864 A1     Sep. 26, 2024

(51) Int. Cl.
*H04W 52/28* (2009.01)
*H04W 64/00* (2009.01)

(52) U.S. Cl.
CPC ......... *H04W 52/283* (2013.01); *H04W 64/00* (2013.01)

(58) Field of Classification Search
CPC ... H04W 52/283; H04W 64/00; H04W 16/08; H04W 52/38; H04W 92/20; H04W 16/18;
(Continued)

(56) References Cited

U.S. PATENT DOCUMENTS 9,185,664 B2    11/2015  Park et al.
9,572,110 B1 *   2/2017  Serfaty ............... H04W 52/283
(Continued)

FOREIGN PATENT DOCUMENTS

JP         2018-195928        12/2018

OTHER PUBLICATIONS

Takuto Arai et al., "Adaptive Movable Access Point System for Offloading Efficiency Enhancement", Technical Research Report of the Institute of Electronics, Information and Communication Engineers (IEICE), vol. 116, No. 46, RCS2016-43, pp. 107-112, The Institute of Electronics, Information and Communication Engineers (IEICE) in May 2016.
(Continued)

*Primary Examiner* — Lana N Le
(74) *Attorney, Agent, or Firm* — IPUSA, PLLC

(57) ABSTRACT

A base station control system includes a first base station of which a disposition position is not determined, and a base station control device including a memory and a processor configured to: divide an existing second base station and terminals connected to the second base station into clusters through clustering; determine a position corresponding to a cluster not including the second base station among the plurality of clusters as a disposition position of the first base station; calculate the number of first terminals connected to the first base station and the number of second terminals connected to the second base station for each of a plurality of transmission powers of the first base station in a case where the first base station is disposed at the position; and (Continued)

| CLUSTER NUMBER | NUMBER OF EXISTING BASE STATIONS | NUMBER OF TERMINALS | MINIMUM VALUE OF RECEIVED POWER FROM EXISTING BASE STATION (dBm) |
|---|---|---|---|
| 1 | 1 | 4 | −55 |
| 2 | 0 | 3 | −70 |
| 3 | 1 | 1 | −65 |
| 4 | 0 | 2 | −65 | select a transmission power of the first base station based on the number of first terminals and the number of second terminals.

7 Claims, 12 Drawing Sheets

(58) Field of Classification Search
CPC ... H04W 52/143; H04W 72/27; H04W 88/08; H04W 52/346; H04W 88/12; H04W 28/0226; H04W 52/30; H04W 4/025; H04W 4/029; H04W 36/0061
See application file for complete search history.

(56) References Cited

U.S. PATENT DOCUMENTS

| | | | |
|---|---|---|---|
| 10,355,835 B2 | 7/2019 | Oyama | |
| 2004/0131029 A1 | 7/2004 | Tobe et al. | |
| 2006/0138224 A1 | 6/2006 | Azami et al. | |
| 2008/0254820 A1* | 10/2008 | Alpert | H04W 52/38 |
| 2011/0143806 A1 | 6/2011 | Song et al. | |
| 2012/0127878 A1 | 5/2012 | Kim et al. | |
| 2013/0065633 A1 | 3/2013 | Sridhara et al. | |
| 2013/0082878 A1 | 4/2013 | Jarvis et al. | |
| 2013/0252604 A1 | 9/2013 | Huber et al. | |
| 2014/0018084 A1 | 1/2014 | Sato et al. | |
| 2014/0162686 A1 | 6/2014 | Lee et al. | |
| 2015/0117183 A1 | 4/2015 | Heo et al. | |
| 2015/0124720 A1 | 5/2015 | Morimoto et al. | |
| 2015/0146638 A1 | 5/2015 | Ohwatari et al. | |
| 2015/0156640 A1 | 6/2015 | Nguyen et al. | |
| 2015/0280888 A1 | 10/2015 | Karsi et al. | |
| 2016/0308635 A1 | 10/2016 | Zhou et al. | |
| 2017/0142664 A1* | 5/2017 | Seo | H04W 52/346 |
| 2017/0245287 A1 | 8/2017 | Lee et al. | |
| 2017/0303209 A1 | 10/2017 | Na | |
| 2018/0184303 A1 | 6/2018 | Egner et al. | |
| 2019/0281500 A1* | 9/2019 | Cummings | H04W 4/02 |
| 2021/0226650 A1 | 7/2021 | Zhao et al. | |
| 2021/0385793 A1* | 12/2021 | Abotabl | H04W 56/0045 |
| 2022/0365163 A1* | 11/2022 | Baek | H04W 4/02 |
| 2023/0189169 A1 | 6/2023 | Vivanco et al. | |
| 2023/0217376 A1* | 7/2023 | Yang | H04W 52/143 455/522 |
| 2024/0323864 A1 | 9/2024 | Nakahira et al. | |

OTHER PUBLICATIONS

Wi-fi Alliance, https://www.wi-fi.org/ja/discover-wi-fi/wi-fi-location, Searched on Dec. 25, 2023.

U.S. Appl. No. 18/294,703 filed Feb. 2, 2022, US20250106782A1, Ntt, Inc.

U.S. Appl. No. 18/683,401 filed 2024/02/13, US20240349201A1, NTT, Inc.

Office Action mailed on Jan. 29, 2026 with respect to the related U.S. Appl. No. 18/579,005.

Notice of Allowance mailed on Mar. 24, 2026 with respect to the related U.S. Appl. No. 18/294,703.

Notice of Allowance mailed on Mar. 3, 2026 with respect to the related U.S. Appl. No. 18/683,401.

* cited by examiner

Fig. 2

Fig. 6
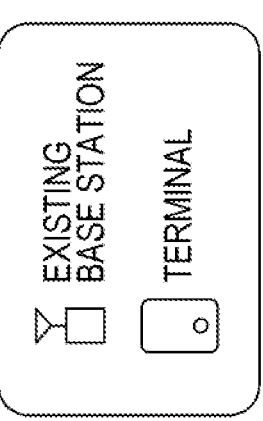
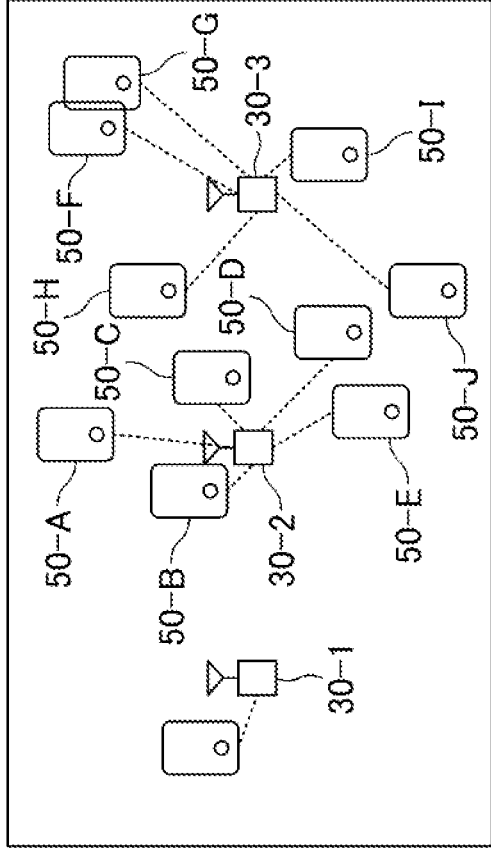

Fig. 8

| CLUSTER NUMBER | NUMBER OF EXISTING BASE STATIONS | NUMBER OF TERMINALS | MINIMUM VALUE OF RECEIVED POWER FROM EXISTING BASE STATION (dBm) |
|---|---|---|---|
| 1 | 1 | 4 | −55 |
| 2 | 0 | 3 | −70 |
| 3 | 1 | 1 | −65 |
| 4 | 0 | 2 | −65 |

Fig. 9

| POSSIBILITY PATTERN NUMBER | TRANSMISSION POWER ADJUSTMENT AMOUNT COLUMN (−dB) |
|---|---|
| 1 | [0,0] |
| 2 | [0,3] |
| ... | ... |

Fig. 10

| POSSIBILITY PATTERN NUMBER | TRANSMISSION POWER ADJUSTMENT AMOUNT COLUMN (−dB) | (a) NUMBER OF CONNECTED TERMINALS OF EXISTING BASE STATION | (b) NUMBER OF CONNECTED TERMINALS OF MOVABLE BASE STATION | (c) BASE STATION UNCONNECTABLE TERMINAL (PRESENT 0, ABSENT 1) | EVALUATION VALUE X |
|---|---|---|---|---|---|
| 1 | [0,0] | [3,2] | [3,2] | 1 | 36 |
| 2 | [0,3] | [3,2] | [3,2] | 1 | 36 |
| ... | ... | ... | ... | ... | ... |

Fig. 11

| POSSIBILITY PATTERN NUMBER | TRANSMISSION POWER ADJUSTMENT AMOUNT COLUMN (-dB) | (a) NUMBER OF CONNECTED TERMINALS OF EXISTING BASE STATION | (b) NUMBER OF CONNECTED TERMINALS OF MOVABLE BASE STATION | (c) BASE STATION UNCONNECTABLE TERMINAL (PRESENT 0, ABSENT 1) | EVALUATION VALUE X | (d) MINIMUM VALUE OF RECEIVED POWER OF EXISTING BASE STATION CONNECTED TERMINAL (dBm) | (e) MINIMUM VALUE OF RECEIVED POWER OF MOVABLE BASE STATION CONNECTED TERMINAL (dBm) | EVALUATION VALUE Y1 VALUE (dBm) | EVALUATION VALUE Y2 VALUE (dBm) |
|---|---|---|---|---|---|---|---|---|---|
| 1 | [0,0] | [3,2] | [3,2] | 1 | 36 | [-55,-65] | [-55,-45] | -65 | -55 |
| 2 | [0,3] | [3,2] | [3,2] | 1 | 36 | [-55,-65] | [-58,-45] | -65 | -58 |
| ... | ... | ... | ... | ... | ... | ... | ... | ... | ... |

Fig. 12
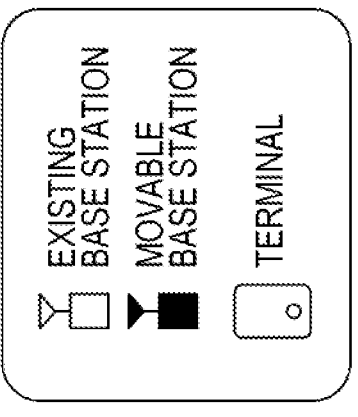
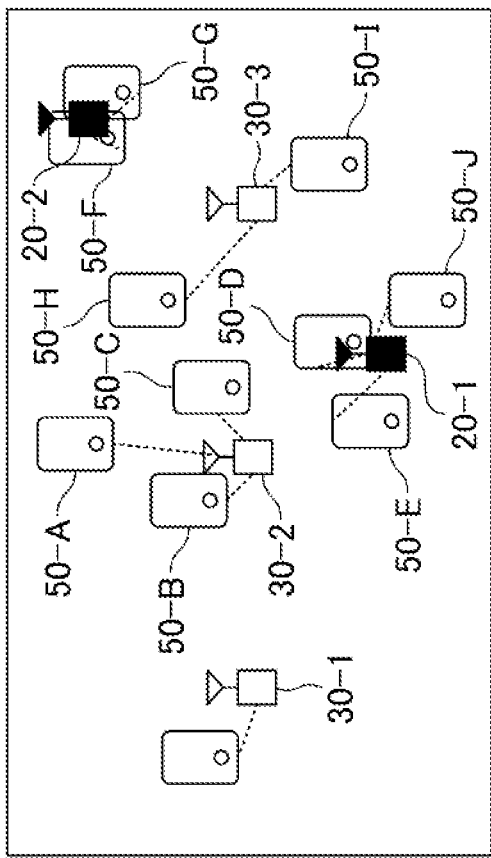

BASE STATION CONTROL SYSTEM, BASE STATION CONTROL METHOD, BASE STATION CONTROL APPARATUS AND PROGRAM

TECHNICAL FIELD

The present invention relates to a base station control system, a base station control method, a base station control device, and a program.

BACKGROUND ART

In a case where wireless base stations are evenly disposed in an area, in order to efficiently secure an area coverage, the communication quality of a specific area may deteriorate due to the influence of terminal congestion, shielding, and the like. On the other hand, a technique of dynamically disposing a movable base station in an area where the communication quality has deteriorated to ameliorate the deterioration of the communication quality has been studied (Non Patent Literature 1).

CITATION LIST

Non Patent Literature

Non Patent Literature 1: Takuto Arai, Daisuke Goto, Masashi Iwabuchi, Tatsuhiko Iwakuni, and Kazuaki Maruta, "Adaptive Movable Access Point System for Offloading Efficiency Enhancement", Technical Research Report of the Institute of Electronics, Information and Communication Engineers (IEICE), vol. 116, no. 46, RCS2016-43, pp. 107-112, The Institute of Electronics, Information and Communication Engineers (IEICE) in May 2016

SUMMARY OF INVENTION

Technical Problem

However, when a movable base station is dynamically disposed, if the received power from the movable base station becomes too large compared with other base stations, many terminals may autonomously connect themselves to the movable base station, and excessive unevenness of terminal connection may occur, leading to deterioration in communication quality.

FIG. 1 is a diagram for describing a problem of a conventional technique. In FIG. 1, a case where one movable base station is additionally installed in an environment where one existing base station and six terminals are present is described as an example. (1) of FIG. 1 illustrates a state before a movable base station is disposed, and (2) illustrates a state after the movable base station is disposed.

Before the movable base station is disposed, six terminals are connected to one existing base station, and communication is congested. Therefore, by disposing one movable base station, congestion is resolved or alleviated.

In the related art, as a result of calculating disposition of the movable base station through clustering for six terminals, for example, as in (2), the movable base stations are installed near the existing base stations.

In this case, among the six terminals, the movable base station is closer to the five terminals than the existing base station. Therefore, in a case where the transmission powers of the existing base station and the movable base station are the same, the signal power received from the movable base station by the five terminals is larger than the signal power received from the existing base station.

In a case where signals from a plurality of base stations can be received, since it is an operation in a general wireless system that a terminal is connected to a base station having the largest received power, the five terminals are connected to the movable base station.

As a result, five terminals are connected to the movable base station, one terminal is connected to the existing base station, and unevenness occurs in the number of terminals connected between the existing base station and the movable base station.

The present invention has been made in view of the above circumstances, and an object thereof is to reduce unevenness in the number of terminals connected to each base station.

Solution to Problem

Therefore, in order to solve the above problem, there is provided a base station control system including a first base station of which a disposition position is not determined; and a base station control device, in which the base station control device includes a clustering unit that divides an existing second base station and terminals connected to the second base station into clusters through clustering, a disposition unit that determines a position corresponding to a cluster not including the second base station among the plurality of clusters as a disposition position of the first base station, a calculation unit that calculates the number of first terminals connected to the first base station and the number of second terminals connected to the second base station for each of a plurality of transmission powers of the first base station in a case where the first base station is disposed at the position, and a selection unit that selects a transmission power of the first base station based on the number of first terminals and the number of second terminals.

Advantageous Effects of Invention

It is possible to reduce unevenness in the number of terminals connected to each base station.

BRIEF DESCRIPTION OF DRAWINGS

FIG. 2 is a diagram illustrating a configuration example of a communication system 1 according to an embodiment of the present invention.

FIG. 6 is a diagram illustrating a specific example of a state of terminals 50 connected to existing base stations 30.

FIG. 8 is a diagram illustrating an example of cluster evaluation values.

FIG. 9 is a diagram illustrating an example of a candidate pattern.

FIG. 10 is a diagram illustrating an example of a calculation result of an evaluation value X of each candidate pattern.

FIG. 11 is a diagram illustrating an example of a calculation result of an evaluation value Yi of each candidate pattern.

FIG. 12 is a diagram illustrating an example of a state of the terminals 50 connected to the respective base stations according to the present embodiment.

DESCRIPTION OF EMBODIMENTS

Figure 1:
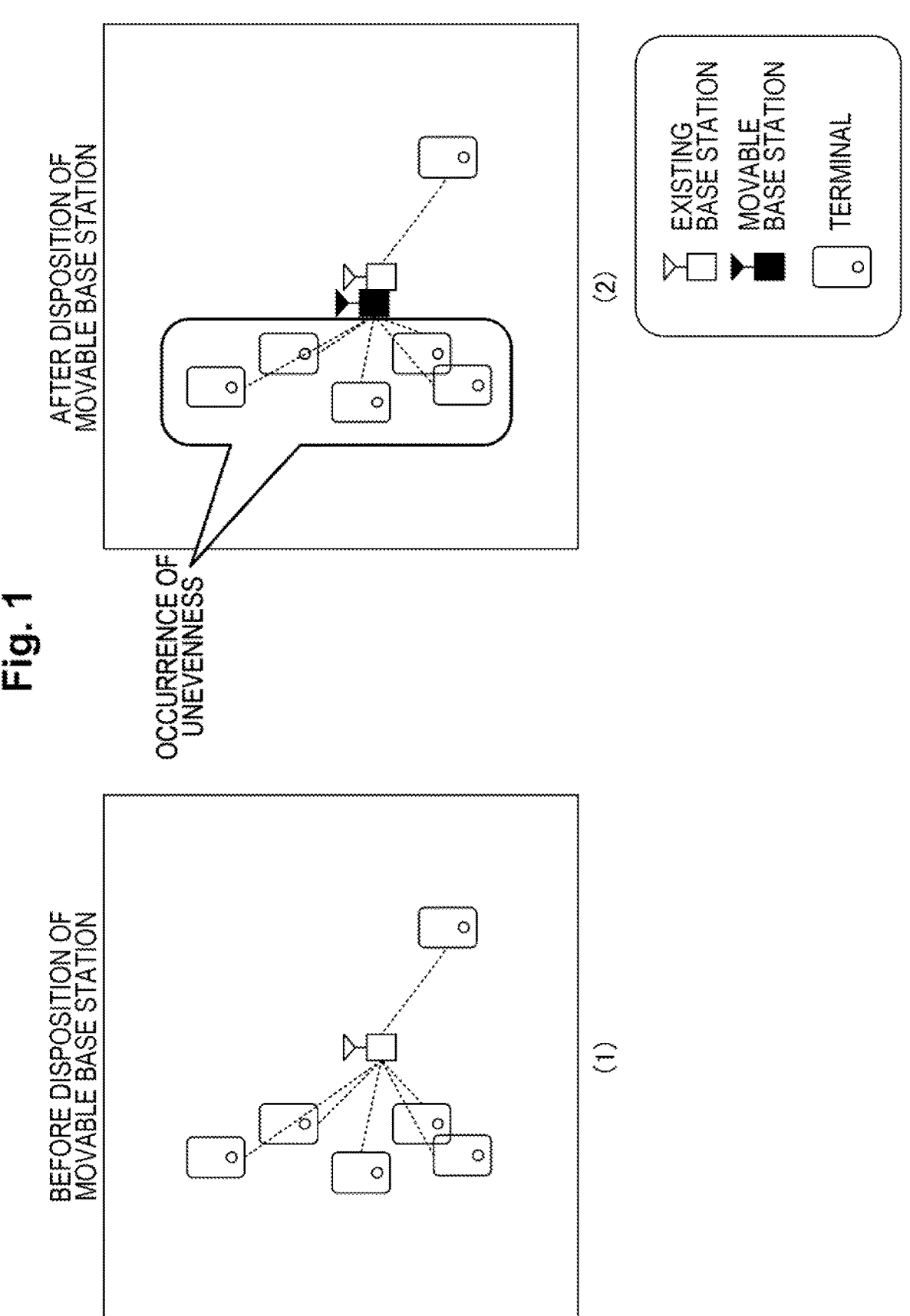
FIG. 1 is a diagram for describing a problem of a conventional technique.
Figure 2:
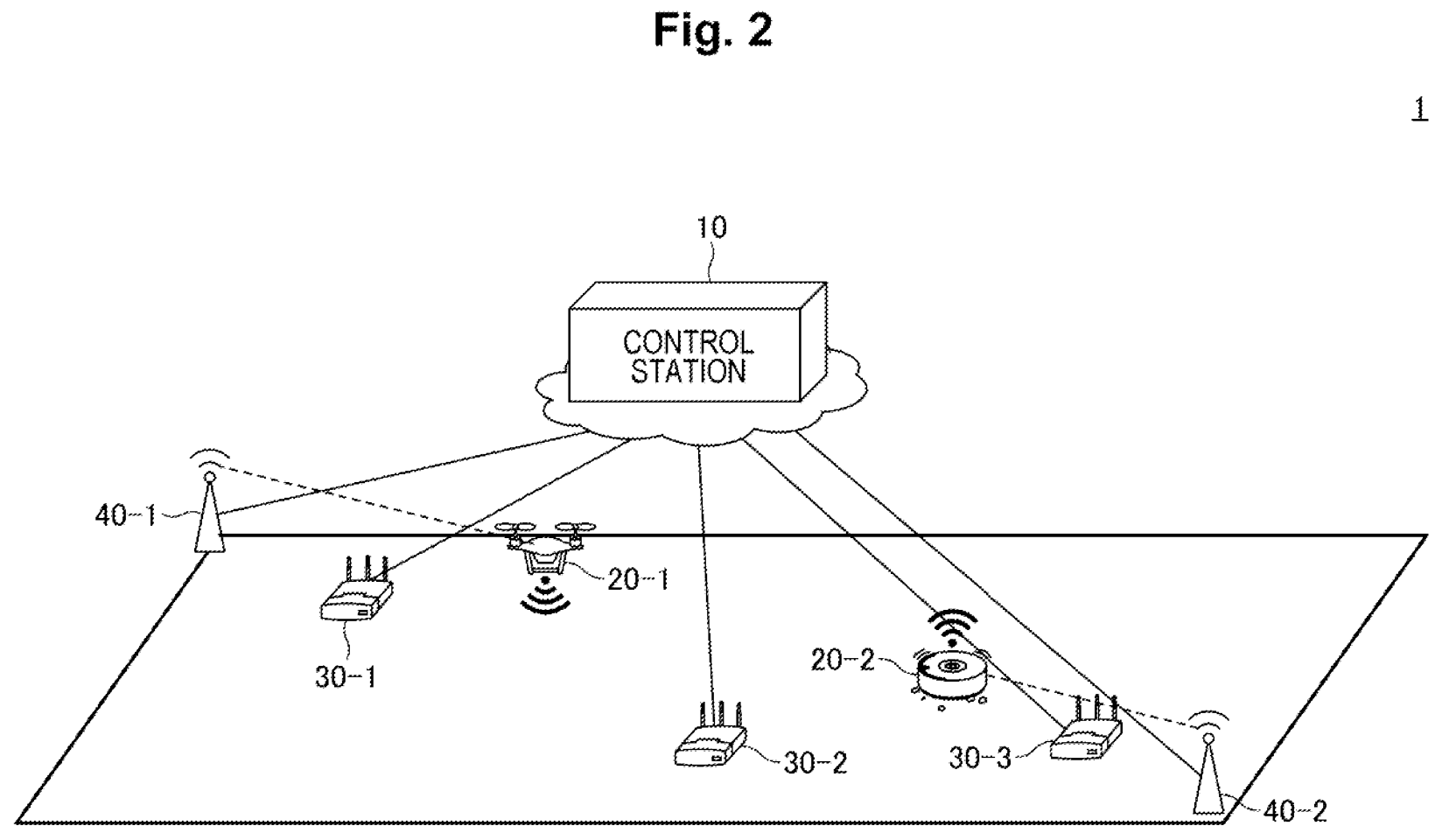

Hereinafter, embodiments of the present invention will be described with reference to the drawings. FIG. 2 is a diagram illustrating a configuration example of a communication system according to an embodiment of the present invention. As illustrated in FIG. 2, a communication system 1 includes one or more existing base stations 30, one or more movable base stations 20, one or more relay base stations 40, a control station 10, and the like. Note that the base station is a base station (access point) based on wireless communication (for example, a wireless LAN).

The existing base station 30 is an existing base station in the present embodiment. In the present embodiment, the existing base station 30 is not a target of movement, but the existing base station 30 may be movable.

The movable base station 20 is a base station that is movable, and is a base station newly disposed (disposition position is not determined) in the present embodiment. For example, in a case where communication is congested in a certain existing base station 30, or the like, the movable base station 20 is dynamically disposed. Note that driving means for moving the movable base station 20 is not limited to specific means. For example, a vehicle, a drone, or the like may be the driving means. The movable base station 20 may be configured to move on a rail provided in advance.

The relay base station 40 is a base station that relays communication between the movable base station 20 and the control station 10. The relay base station 40 is connected to the movable base station 20 via wireless communication. Therefore, the movable base station 20 is movable within a range in which wireless communication with the relay base station 40 is possible.

Note that, hereinafter, in a case where the existing base station 30 and the movable base station 20 are not distinguished, they will be simply referred to as "base stations". Although not illustrated, there are a plurality of terminals (hereinafter referred to as terminals 50) that are wirelessly connected to any base station and perform communication. Each terminal is connected to any base station by autonomous control. The autonomous control is, for example, control in which the terminal is connected to a base station having a relatively large received power in the terminal.

The control station 10 is one or more computers that control disposition of the movable base station 20 and control the transmission power of the movable base station 20. The control station 10 is connected to each of the existing base stations 30 and each of the relay base stations 40 via a network (a wired or wireless network). The control station 10 controls disposition of the movable base station 20 and a transmission power of the movable base station 20 based on information collected from each base station and terminal via the network.

Figure 3:
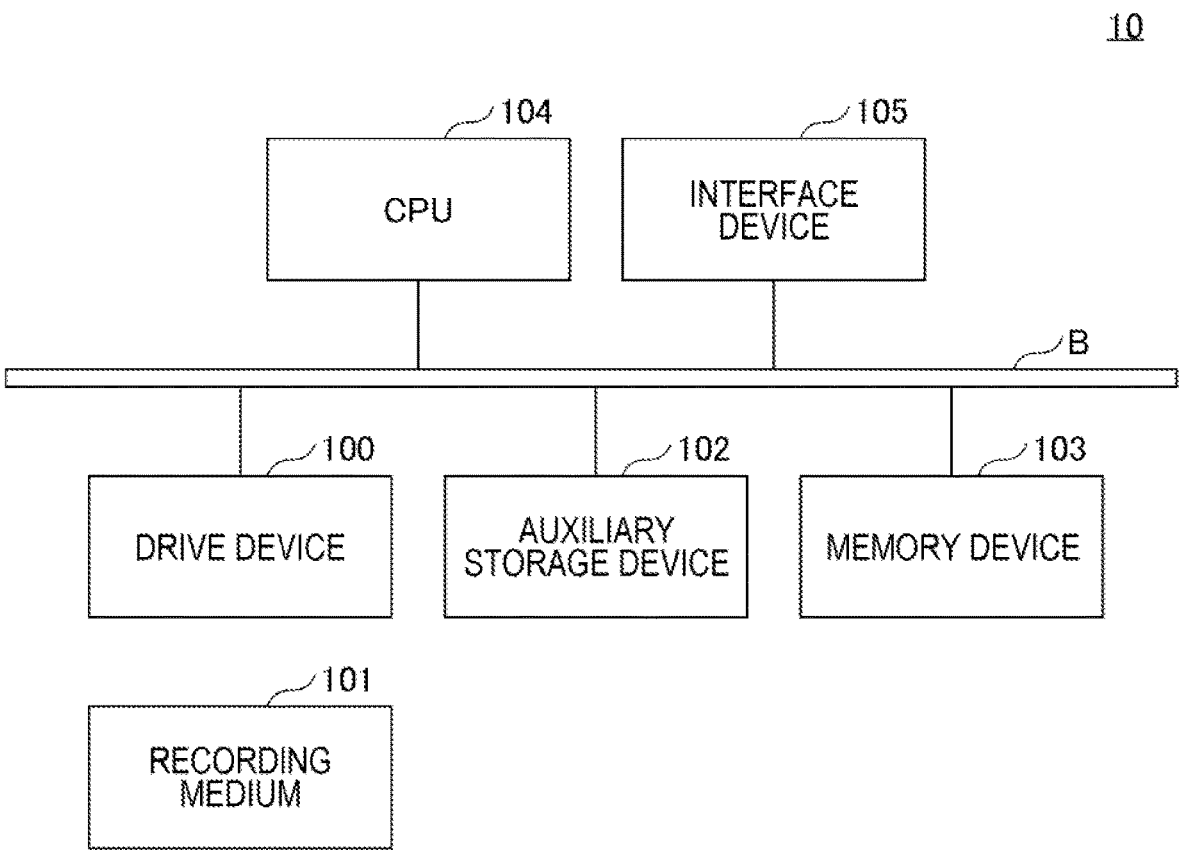
FIG. 3 is a diagram illustrating a hardware configuration example of a control station 10 according to the embodiment of the present invention.

FIG. 3 is a diagram illustrating a hardware configuration example of the control station 10 according to the embodiment of the present invention. The control station 10 in FIG. 3 includes a drive device 100, an auxiliary storage device

102, a memory device 103, a CPU 104, an interface device 105, and the like which are connected to each other via a bus B.

A program for performing processes in the control station 10 is provided by a recording medium 101 such as a CD-ROM. When the recording medium 101 storing the program is set in the drive device 100, the program is installed on the auxiliary storage device 102 from the recording medium 101 via the drive device 100. Here, the program is not necessarily installed from the recording medium 101 and may be downloaded from another computer via a network. The auxiliary storage device 102 stores the installed program and also stores files, data, and the like which are required.

In a case where there is an instruction for starting the program, the memory device 103 reads the program from the auxiliary storage device 102 and stores the program therein. The CPU 104 executes a function related to the control station 10 according to the program stored in the memory device 103. The interface device 105 is used as an interface for connection to a network.

Figure 4:
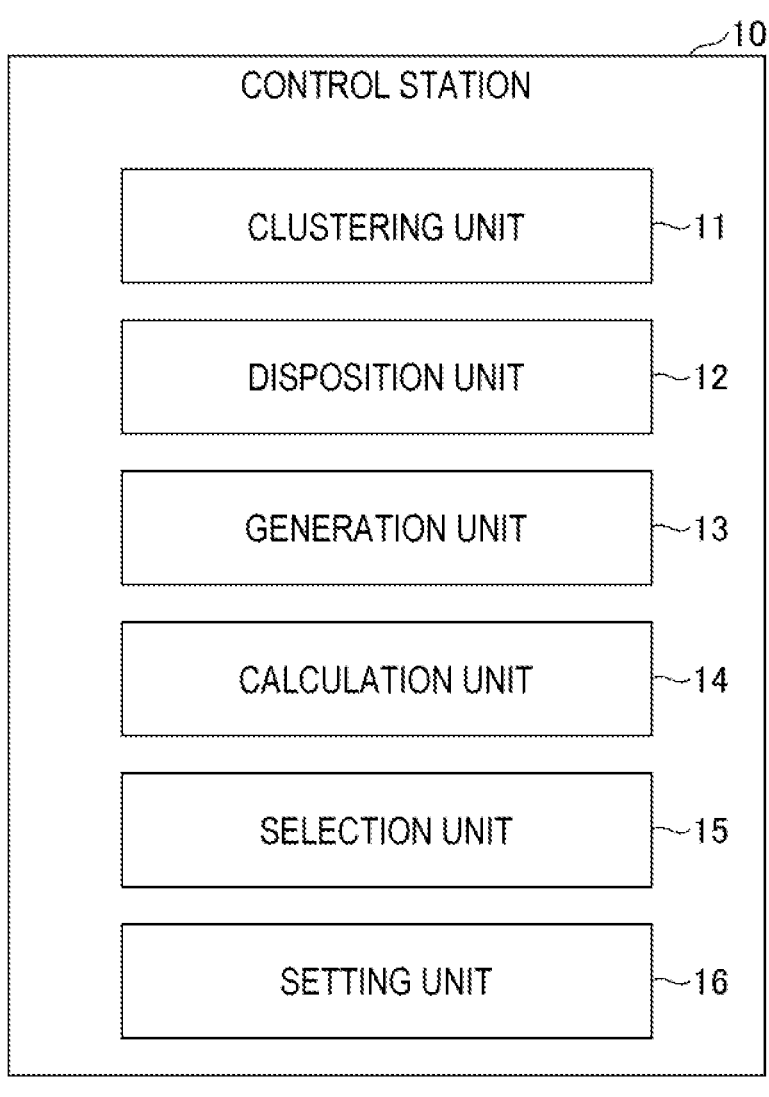
FIG. 4 is a diagram illustrating a functional configuration example of the control station 10 according to the embodiment of the present invention.

FIG. 4 is a diagram illustrating a functional configuration example of the control station 10 according to the embodiment of the present invention. In FIG. 4, the control station 10 includes a clustering unit 11, a disposition unit 12, a generation unit 13, a calculation unit 14, a selection unit 15, and a setting unit 16. These units are implemented by one or more programs installed in the control station 10 causing the CPU 104 to execute processes.

Figure 5:
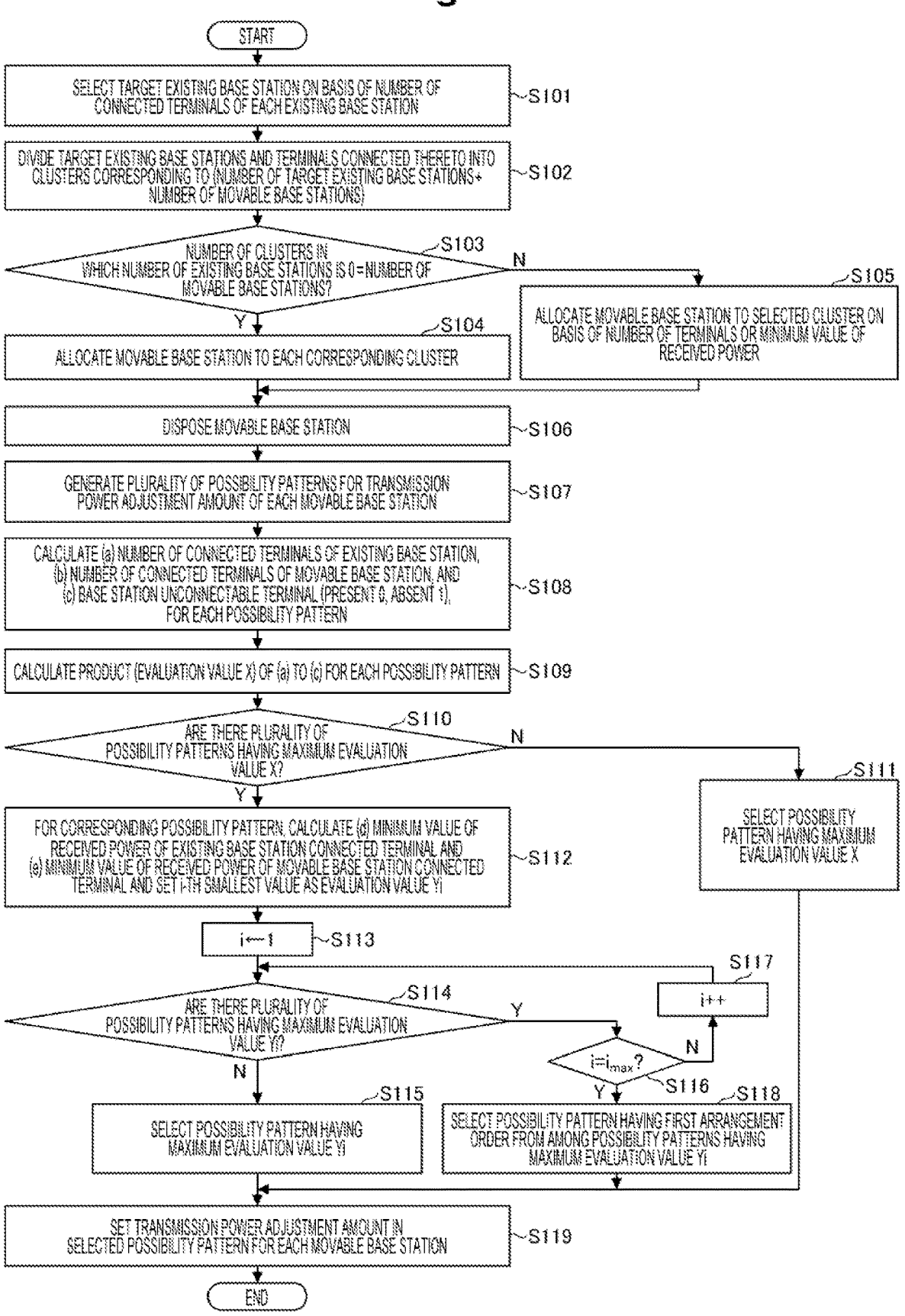
FIG. 5 is a flowchart for describing an example of a processing procedure executed by the control station 10.

Hereinafter, a processing procedure executed by the control station 10 will be described. FIG. 5 is a flowchart for describing an example of a processing procedure executed by the control station 10.

In step S101, the clustering unit 11 selects the existing base station 30 (hereinafter, referred to as a "target existing base station 30") that is an installation target of the movable base station 20 (a load is reduced by the movable base station 20) based on the number of connected terminals of each of the plurality of existing base stations 30. For example, any of the existing base stations 30 in which terminal connections are relatively congested (the number of connected terminals is relatively large) is selected as the target existing base station 30. In this case, the clustering unit 11 determines whether the terminal connection of each existing base station 30 is congested. For example, the clustering unit 11 determines that the existing base station 30 to which the number of terminals 50 to be connected (the number of connected terminals) is greater than or equal to a predetermined threshold value is congested.

FIG. 6 is a diagram illustrating a specific example of a state of the terminals 50 connected to the existing base stations 30. In the present embodiment, a situation is assumed in which three existing base stations 30 are installed, and two movable base stations 20 are additionally installed in a state in which eleven terminals 50 are connected to any of the existing base stations 30. Note that, in the drawing, a dashed line connecting the terminal 50 and the existing base station 30 indicates a connection relationship between the terminal 50 and the existing base station 30 (indicating which of the existing base stations 30 is connected to the terminal 50). Therefore, in the example in FIG. 6, the number of connected terminals of the existing base station 30-1 is one, the number of connected terminals of the existing base station 30-2 is five, and the number of connected terminals of the existing base station 30-3 is five.

In the example in FIG. 6, when a threshold value for determining the congestion of the existing base station 30 is 5, it is determined that the two existing 30 base stations 30, that is, the existing base station 30-2 and the existing base station 30-3 are congested. Therefore, these two existing base stations 30 are selected as the target existing base stations 30.

Alternatively, as another determination method, when the number of connected terminals is included in the top α % among all the existing base stations 30, it may be determined that the existing base stations 30 are congested, and when not included, it may be determined that the existing base stations 30 are not congested. α is a parameter, and for example, when α=50, the existing base stations 30 in the top 50% are in a congestion state.

Alternatively, as still another determination method, the existing base station 30 of which the number of connected terminals exceeds an average number of connected terminals of all the existing base stations 30 may be determined to be in a congestion state.

Subsequently, the clustering unit 11 performs clustering (hierarchical clustering) on a set including the target existing base station 30 and the terminal 50 connected to any one of the target existing base stations 30 as elements based on position information of each element, and divides the set into clusters (a cluster for each target existing base station 30 and for each movable base station 20) corresponding to (the number of target existing base stations+the number of movable base stations) (S102). In the example in FIG. 6, the number of target existing base stations 30 is two, and the number of terminals 50 connected to any one of the target existing base stations 30 is ten. A total number of the target existing base stations 30 and the movable base stations 20 is four. Therefore, the twelve target existing base stations 30 and the terminals 50 are divided into four clusters.

Figure 7:
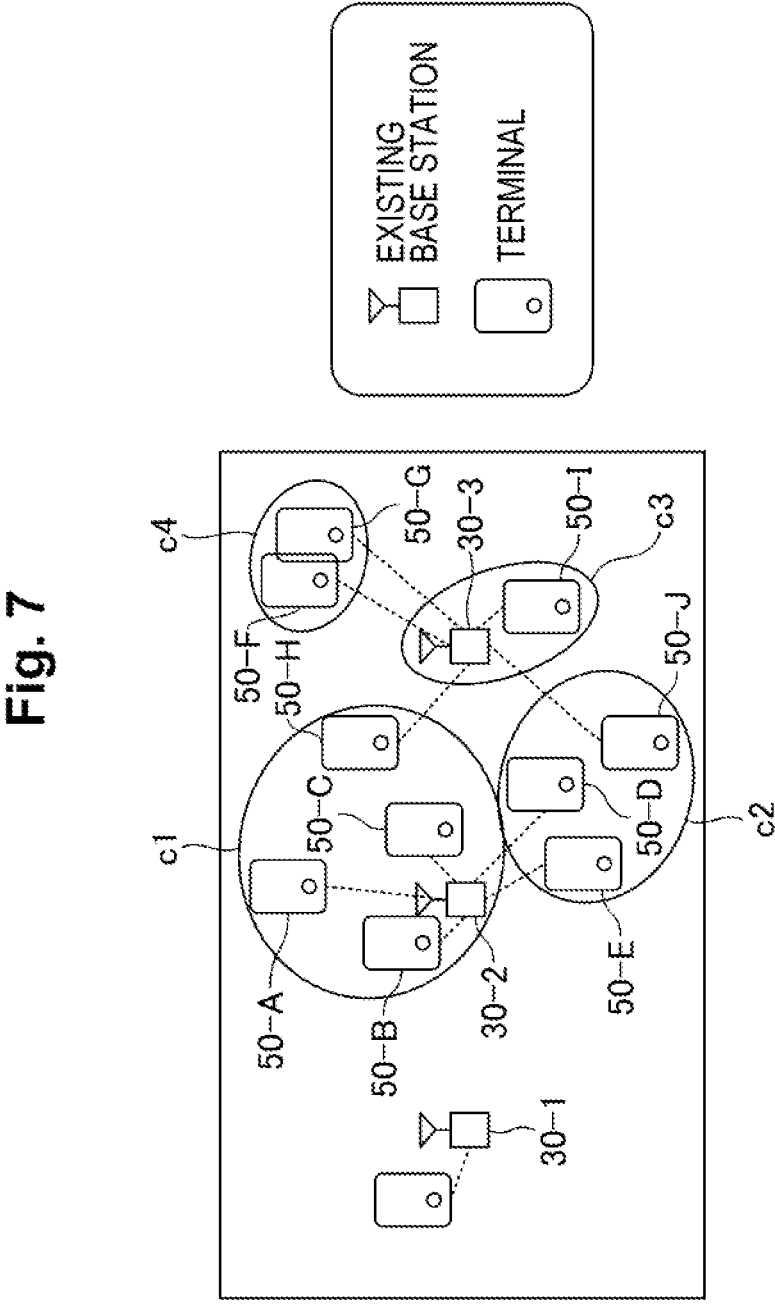
FIG. 7 is a diagram illustrating an example of a result of clustering.

FIG. 7 is a diagram illustrating an example of a result of clustering. FIG. 7 illustrates an example of division into clusters c1 to c4.

Note that position information of each existing base station 30 can be specified based on information collected from each existing base station 30. The position of each terminal 50 can be specified by the control station 10 collecting (collecting via the existing base station 30) position information measured by each terminal 50. For example, the position of each terminal 50 may be specified using the technology disclosed in "https://www.wi-fi.org/ja/discover-wi-fi/wi-fi-location".

The clustering unit 11 calculates, for each cluster, a parameter serving as a reference for evaluating the necessity of disposition of the movable base stations 20 (hereinafter, referred to as a "cluster evaluation value"), and stores a calculation result in the memory device 103.

FIG. 8 is a diagram illustrating an example of a cluster evaluation value. As illustrated in FIG. 8, the cluster evaluation value includes the number of existing base stations, the number of terminals, the minimum value of a received power from the existing base station, and the like. The number of existing base stations is the number of existing base stations 30 belonging to the cluster. The number of terminals is the number of terminals 50 belonging to the cluster. The minimum value of the received power from the existing base station is the minimum value of the power received from the existing base station 30 by the terminal 50 belonging to the cluster.

Subsequently, the disposition unit 12 determines whether or not the number of clusters in which the number of existing base stations is 0 (not including the existing base stations 30) matches the number of movable base stations (S103).

In a case where the number of clusters in which the number of existing base stations is 0 matches the number of movable base stations (Y in S103), the disposition unit 12 allocates one movable base station 20 to each corresponding cluster (S104). In the example in FIG. 7, one movable base station 20 is allocated to each of the cluster c2 and the cluster c4.

On the other hand, in a case where the number of clusters in which the number of existing base stations is 0 exceeds the number of movable base stations (N in S103), the disposition unit 12 allocates one movable base station 20 to each cluster of which the number of terminals is the top Nth (where N=the number of movable base stations) among these clusters (S105). However, in a case where a plurality of clusters correspond to the top Nth cluster, the disposition unit 12 allocates one movable base station 20 to a cluster having the minimum value of the received power from the existing base station 30 among these clusters.

Hereinafter, the cluster to which the movable base station 20 is allocated in step S104 or S105 will be referred to as a "target cluster".

Subsequent to step S104 or S105, the disposition unit 12 determines a position corresponding to each target cluster as a disposition position of each movable base station 20, and performs control for disposing each movable base station 20 at the disposition position (S106). Specifically, the disposition unit 12 transmits, to each movable base station 20, an instruction for moving the movable base station 20 to the determined disposition position. Each movable base station 20 moves to the disposition position designated by the instruction. Note that the center of gravity of a target cluster may be a disposition position of the movable base station 20 allocated to the target cluster, or a disposition position may be determined according to another method.

Once the disposition of each movable base station 20 is completed, the generation unit 13 generates a plurality of different patterns for a combination of transmission power adjustment amounts for each movable base station 20 (S107). Hereinafter, the pattern will be referred to as a "candidate pattern". Note that the transmission power adjustment amount refers to a relative power decrease amount from the maximum transmission power. For example, since a transmission power that can be set varies depending on a country, the transmission power is set as a relative value based on the maximum value in the present embodiment. However, instead of the transmission power adjustment amount, an absolute value of the transmission power may configure a candidate pattern.

FIG. 9 is a diagram illustrating an example of a candidate pattern (or possibility pattern). As illustrated in FIG. 9, in step S107, a candidate pattern number and a transmission power adjustment amount column are generated for each candidate pattern. The candidate pattern number is an identification number of the candidate pattern. The transmission power adjustment amount column is a combination of transmission power adjustment amounts for each movable base station 20. For example, in [0, 0] in FIG. 9, the first "0" indicates a transmission power adjustment amount for one movable base station 20, and the second "0" indicates a transmission power adjustment amount for the other movable base station 20.

Subsequently, the calculation unit 14 calculates evaluation parameters of each candidate pattern based on the position of each base station, the position of each terminal 50 (each terminal 50 connected to any target base station), the transmission power of each base station, and the like (S108). In the present embodiment, the evaluation parameters are (a) the number of connected terminals of the existing base station, (b) the number of connected terminals of the movable base station 20, and (c) a base station unconnectable terminal.

In (a), the number of connected terminals of the existing base station of a certain candidate pattern refers to the number of terminals 50 connected to each target existing base station 30 in a case where a transmission power adjustment amount of each movable base station 20 is according to the candidate pattern.

In (b), the number of connected terminals of the movable base station 20 of a certain candidate pattern refers to the number of terminals 50 connected to each movable base station 20 in a case where a transmission power adjustment amount of each movable base station 20 is according to the candidate pattern.

In (c), the base station unconnectable terminal of a certain candidate pattern refers to the terminal 50 that cannot be connected to any of the movable base stations 20 and the target existing base station 30 among the terminals 50 present in an area in which the existing base station 30 is disposed in a case where a transmission power adjustment amount of each movable base station 20 is according to the candidate pattern. A value in (c) is 0 in a case where the terminal 50 corresponding to the base station unconnectable terminal is present, and is 1 in a case where the terminal 50 corresponding to the base station unconnectable terminal is not present.

In (a) and (b), the calculation unit 14 calculates a received power at each terminal 50 from the target existing base station 30 and the movable base station 20 based on a distance between each terminal 50 and each target existing base station 30 and each movable base station 20 and a transmission power of each target existing base station 30 and each movable base station 20, and calculates the number of connected terminals for each base station when the terminal 50 is connected to a base station having the highest received power.

In (c), the calculation unit 14 determines the presence or absence of the terminal 50 in which the maximum value of the received power calculated for each terminal 50 for each base station (the maximum value of the received power from each target existing base station 30 and the received power from each movable base station 20) in relation to (a) and (b) is below a predetermined threshold value (required received power) as a determination result.

Subsequently, the calculation unit 14 calculates an evaluation value X based on (a) to (c) for each candidate pattern (S109). Here, as an example, a product ((a)×(b)×(c)) of (a), (b), and (c) is calculated as the evaluation value X.

FIG. 10 is a diagram illustrating an example of a calculation result of the evaluation value X of each candidate pattern. FIG. 10 illustrates an example of values of (a) to (c) and an example of the evaluation value X for each candidate pattern.

Subsequently, the selection unit 15 determines whether or not there are a plurality of candidate patterns having the maximum evaluation value X (S110). In a case where there is one candidate pattern having the maximum evaluation value X (N in S110), the selection unit 15 selects the candidate pattern (S111), and proceeds to step S119. Note that the candidate pattern having the maximum evaluation value X is a pattern in which the unevenness of the number of connected terminals between the base stations is small and there is no base station unconnectable terminal, and a transmission power adjustment amount with the small unevenness in terminal connection can be specified for each movable base station 20.

On the other hand, in a case where there are a plurality of candidate patterns having the maximum evaluation value X (that is, in a case where a candidate pattern cannot be uniquely selected with the evaluation value X) (Y in S110), the selection unit 15 calculates, for each candidate pattern having the maximum evaluation value X, (d) the minimum value of a received power of an existing base station connected terminal and (e) the minimum value of a received power of a movable base station connected terminal, and sets an i-th (where i=1 and 2) value (that is, the i-th smallest value) in ascending order of (d) and (e) as an evaluation value $Y_i$ of the candidate pattern (S112). Note that the existing base station connected terminal in a certain candidate pattern refers to the terminal 50 connected to the target existing base station 30 (the terminal 50 of which the received power from the target existing base station 30 is larger than the received power from the movable base station 20) in a case where a transmission power adjustment amount of each movable base station 20 is according to the candidate pattern. The movable base station connected terminal in a certain candidate pattern refers to the terminal 50 connected to the movable base station 20 (the terminal 50 of which the received power from the movable base station 20 is larger than the received power from the target existing base station 30) in a case where a transmission power adjustment amount of each movable base station 20 is according to the candidate pattern. Therefore, in (d), the minimum value of the received power of the existing base station connected terminal refers to the minimum value of the power of the received signal from the existing base station 30 in each existing base station connected terminal. In (e), the minimum value of the received power of the movable base station connected terminal refers to the minimum value of the power of the received signal from the movable base station 20 in each movable base station connected terminal. Note that the received power in the terminal 50 from each base station can be calculated based on a distance between each base station and the terminal 50, a transmission power of each base station, and the like.

FIG. 11 is a diagram illustrating an example of a calculation result of the evaluation value $Y_i$ of each candidate pattern. FIG. 11 further illustrates (d) the minimum value of the received power of the existing base station connected terminal, (e) the minimum value of the received power of the movable base station connected terminal, the evaluation value Y1, and the evaluation value Y2 for the candidate pattern having the maximum evaluation value X.

Subsequently, the selection unit 15 assigns 1 to the variable i (S113). Subsequently, the selection unit 15 determines whether or not there are a plurality of candidate patterns having the maximum evaluation value $Y_i$ (S114). In a case where there is one candidate pattern having the maximum evaluation value $Y_i$ (N in S114), the selection unit 15 selects the candidate pattern (S115), and proceeds to step S119.

On the other hand, in a case where there are a plurality of candidate patterns having the maximum evaluation value $Y_i$ (Y in S114), the selection unit 15 determines whether or not the value of the variable i matches $i_{max}$ (S116). $i_{max}$ is a total number of the target existing base stations 30 and the movable base stations 20. In a case where i does not match $i_{max}$ (N in S116), the selection unit 15 adds 1 to i (S117), and repeatedly performs step S114 and the subsequent steps.

In a case where i matches $i_{max}$ (Y in S116), the selection unit 15 selects a candidate pattern having a first arrangement order in FIG. 11 (having the smallest candidate pattern number) from among candidate patterns having the maximum evaluation value Yi (S118), and proceeds to step S119. In step S112 and the subsequent steps, a candidate pattern having a higher minimum received signal power in the terminal 50 can be selected.

In step S119, the setting unit 16 sets a transmission power adjustment amount in the candidate pattern selected in step S111, S115, or S118 for each movable base station 20. As a result, a state of the terminals 50 connected to the respective base stations is as illustrated in FIG. 12, for example. In FIG. 12, three terminals 50 are connected to the existing base station 30-2, two terminals 50 are connected to the existing base station 30-3, three terminals 50 are connected to the movable base station 20-1, two terminals 50 are connected to the movable base station 20-2, and none of the base stations is congested.

As described above, according to the present embodiment, it is possible to reduce the unevenness of the number of terminals connected to each base station. As a result, improvement in communication quality can be expected.

Note that, in a case where a base station can set different transmission powers for a beacon signal and a data signal, when a transmission power is lowered, a signal transmission power of the data signal may not be lowered and only a transmission power of the beacon signal may be lowered.

Disposition possibilities of the movable base station 20 may be restricted in advance in consideration of a communicable area of a backhaul line accommodating the movable base station 20.

In a case where adjustment with respect to a height direction of the movable base station 20 can be performed, a plurality of disposition possibilities of the movable base station 20 may also be prepared in the height direction.

In a case where the movable base station 20 can change a beam transmission direction (a direction of analog beam forming, selection of an antenna pattern of digital beam forming, and the like), candidate patterns may be further distinguished depending on a case where beam transmission directions are switched.

The present embodiment may be applied not only to the movable base station 20 but also to disposition of fixed base stations and the like. For example, the present embodiment may be applied to determination of a disposition position and transmission power regarding a newly installed fixed base station.

Note that, in the present embodiment, the movable base station 20 is an example of a first base station. The existing base station 30 is an example of a second base station. The control station 10 is an example of a base station control device.

Although the embodiment of the present invention has been described in detail above, the present invention is not limited to such a specific embodiment, and various modifications and changes can be made within the scope of the concept of the present invention described in the claims.

REFERENCE SIGNS LIST

1 Communication system
10 Control station
11 Clustering unit
12 Disposition unit
13 Generation unit
14 Calculation unit

15 Selection unit
16 Setting unit
20 Movable base station
40 Relay base station
30 Existing base station
50 Terminal
100 Drive device
101 Recording medium
102 Auxiliary storage device
103 Memory device
104 CPU
105 Interface device
B Bus

The invention claimed is:

1. A base station control system comprising:
a first base station of which a disposition position is not determined; and
a base station control device
including a memory and a processor configured to:
divide an existing second base station and terminals connected to the second base station into clusters through clustering,
determine a position corresponding to a cluster not including the second base station among the plurality of clusters as a disposition position of the first base station,
calculate the number of first terminals connected to the first base station and the number of second terminals connected to the second base station for each of a plurality of transmission powers of the first base station in a case where the first base station is disposed at the position, and
select a transmission power of the first base station based on the number of first terminals and the number of second terminals.

2. The base station control system according to claim 1, wherein the second base station is any of the second base stations having a relatively large number of connected terminals among the plurality of existing base stations.

3. The base station control system according to claim 1, wherein the processor calculates the number of third terminals that are not connectable to either the first base station or the second base station for each of the plurality of transmission powers of the first base station, and
the processor selects the transmission power of the first base station based on the number of the first terminals, the number of the second terminals, and the number of the third terminals.

4. The base station control system according claim 1, wherein the processor further selects the transmission power of the first base station based on a received power of the first terminal from the first base station and a received power of the second terminal from the second base station that are specified for each transmission power in a case where one transmission power cannot be selected.

5. A base station control method executed by a base station control device including a memory and a processor configured to control a first base station of which a disposition position is not determined, the method comprising:
dividing an existing second base station and terminals connected to the second base station into clusters through clustering;
determining a position corresponding to a cluster not including the second base station among the plurality of clusters as a disposition position of the first base station;

calculating the number of first terminals connected to the first base station and the number of second terminals connected to the second base station for each of a plurality of transmission powers of the first base station in a case where the first base station is disposed at the position; and selecting a transmission power of the first base station based on the number of first terminals and the number of second terminals.

6. A non-transitory computer-readable recording medium having computer-readable instructions stored thereon, which, when executed, cause a computer to execute the method according to claim 5.

7. A base station control device that controls a first base station of which a disposition position is not determined, the base station control device comprising:

a memory and a processor configured to:

divide an existing second base station and terminals connected to the second base station into clusters through clustering;

determine a position corresponding to a cluster not including the second base station among the plurality of clusters as a disposition position of the first base station;

calculate the number of first terminals connected to the first base station and the number of second terminals connected to the second base station for each of a plurality of transmission powers of the first base station in a case where the first base station is disposed at the position; and select a transmission power of the first base station based on the number of first terminals and the number of second terminals.

* * * * *